United States Patent [19]

Brailsford

[11] Patent Number: 4,579,627
[45] Date of Patent: Apr. 1, 1986

[54] PASTE STRIPPER SYSTEM FOR SURFACES

[76] Inventor: Michael I. D. Brailsford, Dorton Hill House, Chilton, Nr Aylesbury, England

[21] Appl. No.: 563,670

[22] Filed: Dec. 20, 1983

Related U.S. Application Data

[63] Continuation-in-part of Ser. No. 311,769, Oct. 15, 1981, Pat. No. 4,426,250.

[51] Int. Cl.$^3$ .................. B44C 1/22; C03C 15/00; B08B 7/00; C23D 17/00
[52] U.S. Cl. ..................... 156/655; 156/345; 156/635; 252/79.5; 252/156; 252/DIG. 8; 134/38
[58] Field of Search ............ 252/79.5, 156, DIG. 8; 156/345, 635, 636, 638, 654, 655, 656; 134/2, 29, 38–40, 42, 201; 15/208

[56] References Cited

U.S. PATENT DOCUMENTS

| | | | |
|---|---|---|---|
| 1,581,413 | 4/1926 | Yoakam | 134/38 X |
| 3,762,953 | 10/1973 | Clarke et al. | 134/38 |
| 3,950,185 | 4/1976 | Toyama et al. | 134/38 |
| 4,381,248 | 4/1983 | Lazar | 134/38 X |

*Primary Examiner*—William A. Powell
*Attorney, Agent, or Firm*—Grimes & Battersby

[57] ABSTRACT

A system is provided for decomposing and removing cured coatings of paint or varnish or the like from surfaces by first applying a stripper composition to the surface to be stripped, thereupon applying cover means over the applied stripper composition, permitting the stripper composition to react with and decompose said surface coating and thereupon remove the cover means and decomposed surface coating which has adhered to the cover means. The stripper composition includes an active component selected from the group consisting of alkali earth metals and alkali metals and organic solvents. In a preferred embodiment, the active component is methylene chloride. The cover means include polypropylene fibers and preferably includes pile elements.

A method for effecting such paint or varnish removal on a surface is further provided using said system.

15 Claims, No Drawings

PASTE STRIPPER SYSTEM FOR SURFACES

RELATED APPLICATION

This is a continuation-in-part application of co-pending parent application Ser. No. 311,769 filed on Oct. 15, 1981, now Pat. No. 4,426,250 entitled Stripper System for Surfaces.

BACKGROUND OF THE INVENTION

The present invention relates generally to a system for stripping or otherwise removing cured coatings of paint, varnish or the like from surfaces containing said coatings and, more particularly, to such a system which includes a paste stripper composition adapted to be first applied to the surface to be treated. Cover means are further provided for overlaying said stripper composition simultaneously with or after application of the paste stripper composition to the surface. The cover means are adapted to enhance the decomposition of the surface coating by retarding evaporation of the stripper composition and to assist in the removal of at least a portion of the stripper composition and decomposed coating.

It is well known in the art to remove or otherwise strip cured coatings of paint, varnish or the like from surfaces by treating the surfaces with a stripper composition or stripper system which includes an organic solvent such as, for example, methylene chloride as its active ingredient. Commercially available paint stripper compositions containing methylene chloride are, in fact, well known. The use of an organic solvent such as methylene chloride as an active ingredient in a paint stripper composition provides excellent paint stripping capabilities.

The use of methylene chloride as the active ingredient in such composition, however, presents a number of distinct disadvantages. The ability of such organic solvents to attack multiple layers of coatings at the same time is limited by the rate at which such solvents evaporate into the air. In many instances, particularly where there are many layers of paint to be removed, multiple applications are necessary with an attendant increase in cost and labor since each layer of paint must be scraped off by hand before any subsequent application of solvent may be applied. Further problems can be experienced when removing paint from curved surfaces and from intricately formed moldings. When using metal scrapers, in particular, considerable damage can be done to such surfaces.

The use of organic solvent stripper systems on vertical surfaces presents a still further problem since their application is difficult, if not impossible, to control. For example, the removal of paint from the door panel of an automobile where only a small amount of paint must be removed presents inherent difficulties due to run-off problems.

Against the foregoing background, it is a primary object of the present invention to provide a paint stripper system which can readily and effectively be used on a variety of surfaces for the removal of cured surface coatings therefrom.

It is another object of the present invention to provide such a system which includes a stripper composition which is in the form of a paste and which has, at its active ingredient, an organic solvent such as methylene chloride.

It is still another object of the present invention to provide such a system wherein the stripper composition includes methylene chloride and an inert carrier such as, for example, kaolin.

It is yet another object to provide such a system which includes cover means adapted to to assist in the decomposition process of the cured surface coating to be stripped and, further, which permits ready removal of the decomposed coating from the surface.

SUMMARY OF THE INVENTION

The present invention, in brief summary, comprises a paint stripper system for decomposing and removing a cured coating from a surface. The system includes a paint stripper composition, preferably in paste form, which is adapted to decompose a surface coating upon application thereof on said surface and to thereupon permit removal of the decomposed surface coating.

The paint stripper composition may include a variety of different active ingredients including alkali metal oxides, alkali metal hydroxides, alkali metal carbonates, alkali earth metal oxides, alkali earth metal hydroxides, alkali earth metal carbonates and such organic solvents as methylene chloride, methanol and methyl ethyl ketone. In a preferred embodiment, methylene chloride is used as the active ingredient in combination with an inert material such as, for example, kaolin. The stripper composition is adapted to be directly applied to the surface to be stripped and cover means are thereupon applied over said stripper composition. The cover means, which preferably include a pile surface, are adapted to accelerate and augment the decomposition process since the cover means tend to retard evaporation of the organic solvent as well as facilitate removal of the stripper composition and decomposed surface coating by permitting the decomposed surface coating to be stripped off along with the cover means.

DETAILED DESCRIPTION OF THE INVENTION

In accordance with the teachings of the present invention, a paint stripper composition is provided which is adapted to be either directly applied to the coated surface which is intended to be stripped or applied in association with cover means which are adapted to be overlaid the stripper composition.

The paint stripper composition comprises at least one active component or ingredient (a) selected from the group consisting of: alkali metal oxides, alkali metal hydroxides, alkali metal carbonates (e.g., bicarbonates or other carbonates of alkali metals), alkali earth metal oxides, alkali earth metal hydroxides, alkali earth metal carbonates (e.g. bicarbonates or other carbonates of alkali earth metals), and organic solvents (e.g. methylene chloride, ethylene dichloride, trichlorethylene, monochlorbenzene, carbon tetrachloride, o-dichlorbenzene, propylene dichloride and 1,2,4 trichlorobenzene). The use of such organic solvents and, in particular, methylene chloride, is preferred.

Cover means, preferably a cover blanket including pile elements thereon, are provided for covering said paint stripper composition for at least a portion of the time said paint stripper composition remains on and treats said surface. A cover blanket made from polypropylene is preferred. The cover means are adapted to enhance decomposition of the cured coating on the surface to be stripped as well as to facilitate removal of at least a portion of the stripper composition and decomposed surface coating when the cover means are stripped off or otherwise removed from the surface.

According to a second aspect of the present invention, there is provided a paint stripper composition suitable or intended for use as a paint stripper composition, said composition comprising at least one of said active components (a).

According to a third aspect of the present invention, there is provided cover means intended to be used in conjunction with said stripper system.

Each of the active alkali components (a) can be provided in any suitable manner or form, such as, for example, as an anhydrous or hydrated material. Preferred active components (a) include sodium hydroxide (available as solid particles of caustic soda) and/or potassium hydroxide available as solid particles of potash), and/or calcium hydroxide (available as solid particles of hydrated lime), and/or magnesium hydroxide (available as solid particles). It will be appreciated that other materials such as, for example, barium hydroxide and/or strontium hydroxide can be used. Such materials are, however, more expensive in cost. Preferably, both sodium hydroxide and calcium hydroxide (available as hydrated lime) may be included as active alkali components in the stripper composition.

The stripper composition when incorporating an alkali active component (a) can contain (i) at least one material selected from the group consisting of alkali metal oxides, alkali metal hydroxides and alkali metal carbonates; and/or (ii) at least one material selected from the group consisting of alkali earth metal oxides, alkali earth metal hydroxides, and alkali earth metal carbonates. The ratio of total material (i) % weight to total material (ii) % by weight, based on the sum of the total weights of material (i) and material (ii) can be any convenient value, i.e. in the range of 1 to 50% by weight of total material (i) to 99-50% by weight of total material (ii). A preferred range is 5–15% by weight of total material (i) to 85–95% by weight of total material (ii). In a particularly preferred embodiment, the ratio of 10% by weight of total material (i) to 90% by weight of total material (ii).

The stripper composition when containing an alkali active component (a) can comprise, together with said at least one active alkali component (a), at least one liquid component (b) which may be either an organic or an inorganic liquid. Examples of suitable inorganic liquids include water and/or ammonium hydroxide (such as, for example, household ammonia). Examples of suitable organic liquids include chlorinated hydrocarbons such as methylene chloride. Preferably, in domestic use, no organic liquids are used however, such liquids could be used in the event that appropriate safety precautions are taken. The ratio of the total weight of said at least one active component (a) to the total weight of said at least one liquid component (b) can be any convenient value, i.e. in the range of 0.5/1.0 Kg./liter to 1.5/1.0 Kg/liter, i.e. substantially 1.0 Kg/liter or substantially 1.3 Kg/liter. It should be noted that if a surface can decompose in response to a dry stripper composition, the use of the at least one liquid component (b) should not be used but rather a more convenient liquid may be used.

The stripper composition can comprise, together with the at least one active component (a) and/or the at least one liquid component (b), at least one additive component (c) selected from the group of additives suitable for modifying at least one property of the stripper composition so as to enable and/or enhance control of its use. Examples of such known additive components include solid, liquid and/or gaseous additives, for example, additives selected from the group consisting of accelerators, adhesives, carriers, corrosion inhibitors, dyes, foam producing agents, gelling agents, placticizers and surfactants (i.e. detergents or other surface tension modifiers, for instance the soap sodium lauryl sulphate). Any said additive can serve at least one additive function, i.e. an adhesive can also have a gelling function. One preferred group of additives are polysacharides, i.e. starches from natural materials with or without chemical modification thereof, for instance: flour or meals derived from seeds (e.g. from cereals) or tubers (e.g. potatoes). The word "seed" may include beans or nuts. Another group of preferred additives include cellulose and derivatives of cellulose. Examples of such derivatives include Cl-4-alkyl cellulose, for instance methyl or ethyl cellulose; hydroxy Cl-4 alkyl cellulose, for instance hydroxymethyl or hydroxyethyl cellulose; other cellulose ethers; cellulose esters; and cellulose salts (e.g. sodium carboxymethylcellulose). Various wallpaper pastes contain suitable cellulose derivatives, i.e. wallpaper paste sold under the trademark "Rex" contains dimethyl carboxy cellulose and is a suitable additive for the present invention. Sodium carboxymethlyhydroxyethyl cellulose is another instance of a "carboxy" cellulose.

It has further been found that the addition of wood fibers in an amount up to about 30% by weight of the toal stripper composition serves to enhance the ability of the composition to decompose the surface. A particular preferred amount of wood fiber is between about 5% and about 30% by weight of the total stripper composition.

Another preferred group of additives are polymeric alcohols which are not polysaccharides, i.e. polyvinyl alcohol. A further preferred group of additives are polymeric esters that are not polysaccharides, i.e. polyvinyl acetates or polyvinylmethacrylates. Examples of some other groups of additives are vegetable derived proteins or animal derived proteins, the former being e.g. present in flours or meals, the latter being e.g. gelatin or isinglass. Pectin can also be used. Preferably, said additive component (c) is sufficiently hydrophilic to enable its dispersion, e.g. for forming a gel in the presence of water, preferably at room temperature. The total weight of said at least one additive component (c) can be any convenient value, e.g. 1 to 10 parts by weight per 100 parts by weight of the total weight of said at least one active component (a), e.g. substantially 5 parts by weight of the total weight of said at least one additive component (c).

In a preferred embodiment, the active component (a) is an organic solvent selected from the group consisting of methylene chloride, ethylene dichloride, trichlorethylene, monochlorbenzene, carbon tetrachloride, o-dichlorbenzene and propylene dichloride, 1,2,4 trichlorbenzene. Methylene chloride is a particularly preferred organic solvent. The organic solvent active component (a) in the preferred embodiment can comprise between about 15% and about 85% by weight based on the weight of the total stripper composition and preferably comprises between about 50% and about 60% by weight of the total stripper composition.

In the preferred embodiment wherein the active component (a) is an organic solvent such as, for example, methylene chloride, additional solvents such as methanol and methyl ethyl ketone may be added to serve as enhancers and surfactants, respectively. Methanol, added in an amount between about 0% and about 10% and preferably in an amount between about 2% and about 4%, both based on the weight of the total composition, may be added as an enhancer. Similarly, methyl ethyl ketone, a quaternary ammonium halide such as Gloquat C or other suitable surfactants may be added to break down the surface tension, preferably in an amount between about 0% and about 4% and preferably in an amount between about 2% and about 3% by weight based on the weight of the total stripper composition. Other suitable surfactants include such cationic surfactants as other quaternary ammonium halides, quaternary ammonium ethosulphates and fatty amide acetate imidazolines.

In addition to the organic solvent active component (a) in the preferred embodiment, a carrier such as, for example, clay or kaolin, is added, preferably in an amount between about 15% and about 85% by weight based on the weight of the total stripper composition. The additional of kaolin as a carrier in an amount between about 30% and about 40% by weight of the total stripper composition is preferred. Other suitable carriers include bentonite, laponite, natural and synthetic clays, wood flour, cellulose (paper and wood products), textile fibers, organic and inorganic fibers, vermiculite, ground paper, diatamacious earths, Fullers earths, kieselguhr, ground pumice and talc.

To the organic solvent active component (a) and the carrier in the preferred embodiment are added one or more additive components selected from the group consisting of thickening agents, diluents, activators and the like. In a particularly preferred embodiment, a long chain cellulose and preferably a carboxy methylene cellulose such as Cellacol MMPRI, is added in an amount between about 0% and about 10% and preferably in an amount between about 1% and about 2% by weight based on the weight of the total stripper composition. A diluent such as, for example, water may also be added in an amount between about 0% and about 1% by weight based on the weight of the total stripper composition. An evaporation retarder such as, for example, parafin wax, may further be added in an amount between about 0% and about 2% by weight based on the weight of the total stripper composition and preferably in an amount between about 1% and about 2% by weight. Other suitable evaporation retarders include, for example, high boiling point solvents such as benzyl alcohol, xylene and glycol monomethyl ethers.

The addition of wood fiber in an amount up to about 30% by weight of the total stripper composition has been found to enhance the ability of the stripper composition to decompose and remove the cured surface coating. In particular, an amount of wood fiber in an amount of between about 5% and about 30% by weight of the total composition has proven particularly effective. The presence of wood fibers serves as a thickening or gelling agent effectively serving to hold the composition together and form a skin over the composition.

In the preparation of said preferred organic solvent stripper composition, the components are all admixed together at essentially ambient temperature with the organic solvent preferably introduced first followed by the enhancer, the diluent, the additive components followed by the carrier and admixed to form a paste like consistency.

Said permeable cover means can have any suitable nature, e.g. be at least partly flexible, be at least partly rigid, be at least partly continuous, be at least partly discontinuous, be at least partly permeable, or be at least partly impermeable. At least one of those properties can be possessed by the cover means. Preferably, the cover means have pile elements to which said removed treatment product can become attached. The pile elements can be provided in any suitable way and have any suitable nature. Preferably, said cover means comprises fabric having said pile, e.g. in the form of pile elements resulting from the process of making the fabric. Any said pile element can have any shape(s) and disposition(s), e.g. have free ends or loops. Preferably, the cover means comprises fabric having pile and a particularly preferred pile containing fabric is felt available under the trademark "POLYFELT TS" marketed by Chemie Linz A.G. of Austria. A brochure entitled "POLYFELT TS" published by Chemie Linz A.G. under the reference 3277/78/03 engl. states on page 2 thereof that "POLYFELT TS" refers to a material that is an endless fiber fabric which is produced by a purely mechanical procedure by means of needle punching, and that "POLYFELT TS" has a preferential permeability to water. Page 40 thereof refers to polypropylene endless febres from which "POLYFELT TS" is made. "POLYFELT TS" is very suitable for use in the present invention.

In gereral, the cover means can comprise any material(s) in its constitution, e.g. polypropylene as mentioned above, other polyalkylenes, polyamides (e.g. nylons), polyesters (e.g. terylenes), and polyvinylhalides (e.g. polyvinylchlorides). Although synthetic "cover" materials are convenient, natural material(s) can be used, e.g. cotton, wool or fur, if desired, together with at least one synthetic "cover" material. When the cover means is at least partly permeable, the permeability should preferably be such that any solid particles in the stripper composition and/or treatment product do not pass through and out of the cover means. Impermeability of the cover means can be sufficient to prevent uncontrolled drying of the stripper paste and/or of the wet decomposed surface coating. The material(s) chosen for the cover means will depend on practical circumstances, e.g. the period of application of the stripper paste. If desired, the cover means can be held in place during use of the stripper paste, this holding being in addition to the adhesion provided by means of the stripper paste and/or decomposed surface coating. For example, at least one portion (e.g. an edge) of the cover means can be bonded or fixed by fastener means, (e.g. when one edge overlaps another edge thereof) or to something else e.g. a member bearing any surface to be treated by the stripper system. Examples of the fastener means comprise for instance at least one of the following groups: pressure sensitive adhesives, and latching devices (e.g. snap fasteners and/or zippers and/or buttons).

It has also been found that the fibers, preferably the thermoplastic fibers which form the cover means, for example, polypropylene fibers, may be actually incorporated into the stripper composition. In such manner, upon application of the stripper composition to the surface to be treated, the fibers contained in the stripper composition serve to form its own skin or cover. Upon subsequent drying of the stripper composition, the dried composition can thereupon be physically stripped off with the decomposed surface coating as well. It will be appreciated that the incorporation of the fibers within the stripper composition eliminates the additional step of subsequently applying said cover means over the stripper composition since the cover means are incorporated therein. This is particularly important in commercial applications due to the substantially reduced labor required to perform such applications. A number of different types of fibers may be used. For example, polyethylene, mineral wools, fiberglass, polyamides, polyesters, polyalkenes and polyvinylhalides may be used. The use of polypropylene fibers is, however, preferred and, in particular, polypropylene fibers between about ¼″ and about 3″ in length. The use of polypropylene fibers approximately ½″ long has proven particularly effective. The amount of fiber material incorporated into the stripper composition will vary, depending upon the active component and the end application. For example, it has been found that when the active component (a) is an alkali, polypropylene fiber in an amount between about 10% and about 50% by weight based on the weight of the stripper composition is an effective amount, although an amount between about 20% and about 25% by weight of fiber is preferred. The actual amount by weight of fiber as a percentage of weight of the total stripper composition will vary as a function of the particular active component (a) used and the application.

It will be appreciated that the stripper system can be used in any suitable way. In one mode, the stripper composition, preferably in paste form, is first applied to the surface to be treated and, thereafter, the cover means are placed over the applied stripper composition. In another mode, the stripper composition is actually incorporated in the cover means, and thereafter the cover means containing the stripper composition are placed over the surface to be treated. As described above, the stripper composition can also include fiber material such as, for example, polypropylene fibers which serve as suitable cover means thus eliminating the need for a subsequent application of the cover means.

The stripper paste and/or cover means can be provided in ways suitable for dispensing, e.g. from dispensing means that let a web or portions of preformed stripper composition be withdrawn or exposed for use. A roll of cover means or of preformed stipper composition can be provided as a dispenser roll that can be unwound. When the stripper composition is preformed, the stripper composition can be protected by removable protective means, e.g. sheet or strip means having release properties, for instance a release liner in a roll of the stripper composition or release strip on the stripper composition. The preformed stripper composition can be sheetlike, striplike or padlike.

The stripper composition can be used in any suitable application manner, e.g. in building construction or maintenance of any kind, or in other kinds of construction or maintenance, e.g. road construction where a paint coating is to be removed from a road surface.

The following examples serve to illustrate the methods of the present invention and are not construed as limiting the scope thereof.

EXAMPLE I

10% by weight of fine particles of solid caustic soda was admixed with 90% by weight of fine particles of solid hydrated lime. 2 Kg of the resultant dry composition X was then admixed with 1.5 liters of water at room temperature. The resultant product was then used in two alternative modes: (1) in which the product is coated onto a painted surface and wet POLYFELT TS is applied to the coating; and (2) in which the product is on wet POLYFELT TS felt and then applied to a painted surface. After a period of several hours for modes (1) and (2), the POLYFELT TS was removed, and a substantial amount of treatment product formed from the paint was removed with the POLYFELT TS.

EXAMPLE II

To 100 parts by weight of composition X made as in Example 1 were added substantially 5 parts by weight of "Rex" wallpaper paste, dry, see above. The modified composition was put into two samples to which water was added; i.e. Sample A was 2 Kg modified composition with 1.5 liters of water, and Sample B was 1 Kg modified composition with 1.13 liters of water. Samples A and B were then used in modes (1) and (2) of Example 1. The treatment periods compared with Example 1 were substantially reduced as a result of the wallpaper paste.

EXAMPLE III

To composition X of Example 1 and to the modified composition X of Example 2 were respectively added substantially 5 parts by weight of sodium lauryl sulphate. The resultant compositions were put into samples A,B,C,D in a manner similar to that described in Example 2 and water was added in accordance with the ratios given in Example 2, such that there were two samples corresponding to Example 1 and 2 samples corresponding to Example 2. The treatment periods used in modes corresponding to those of Examples 1 and 2 gave good results in the removal of treatment product by POLYFELT TS.

The permeable cover means can be wetted before or during use so as to prevent the cover means from drying the stripper paste. At least one component (b) can be provided via the cover means acting, for example, as a wick. Sealant means can be applied to the exterior of the cover means, e.g. a silicone based sealing coating and/or impregnant. The removed cover means can be washed and made ready for reuse. Stripping provided by means of the present invention can give various finishes, e.g. clean, etched or polished surfaces which can be washed, etc.

EXAMPLE IV

The following dry composition for a stripper paste of the present invention had the following dry formulation:

| Component | Parts by Weight |
| --- | --- |
| Fine particles of solid caustic soda | 10.00 |
| Fine particles of solid hydrated lime | 84.00 |
| "Rex" wallpaper paste (dry) or Celacol (dry) or Courlose (dry) | 3.00 |
| Fine particles of wheat starch, Jalan D57, available from Laing National Ltd., England. | 2.00 |
| Sodium lauryl sulphate powder | 1.00 |
| | 100.00 |

EXAMPLE V

The following dry composition for a stripper paste of the present invention had the following dry formulation:

| Component | Parts by Weight |
|---|---|
| Fine particles of solid caustic soda | 10.00 |
| Fine particles of solid hydrated lime | 84.00 |
| Fine particles of wheat starch, Jalan D57 | 5.00 |
| Sodium lauryl sulphate powder | 1.00 |
| | 100.00 |

Water soluble cellulose ethers suitable for use in any solid paste are readily available, e.g. under the trademarks CELACOL and COURLOSE of British Celanese Limited; for instance sodium carboxymethyl cellulose for COURLOSE; and hydroxyethyl cellulose, hydroxypropyl methyl cellulose, or methyl cellulose for CELACOL.

EXAMPLE VI

The following paint stripping composition was prepared:

| Ingredient | % By Weight |
|---|---|
| Methylene chloride | 55.3% |
| Methanol | 2.9% |
| Methyl Ethyl Ketone | 1.25% |
| Cellacol MMPRI | 1.3% |
| Gloquat C | 1.0% |
| water | 0.25% |
| parafin wax | 1.0% |
| kaolin | 37.8% |
| | 100.0% |

The stripper composition was prepared by initially introducing the methylene chloride at ambient temperature followed by methanol and water. The remaining ingredients were then introduced and the resultant composition admixed until a paste consistency was achieved.

The resultant stripper composition was thereupon tested by applying said composition to an automobile door panel containing multiple layers of cellulose based paint. A cover blanket of polypropylene having a pile was thereupon applied the stripper composition was permitted to remain on the surface for approximately 10 minutes whereupon the cover blanket was removed. Removal of the cover blanket likewise caused a removal of the underlying paint leaving behind a clean metal finish on the door panel.

EXAMPLE VII

The same stripper composition of Example VI was prepared and applied with a cover blanket to a wood door containing an oil based paint of approximately 80 year vintage. After approximately 30 minutes, the cover blanket was removed along with the oil paint leaving behind bare wood.

EXAMPLE VIII

The same stripper composition of Examples VI and VII was prepared and applied with a cover blanket to a piece of veneered furniture containing a top coat of varnish. After approximately 15 minutes, the cover blanket was removed together with the decomposed varnish revealing the original color and grain of the underlying wood of the piece of furniture.

Although the foregoing Examples illustrate certain features of the novel composition and method of the present invention, it will, of course, be appreciated that the teachings of this application encompass broader and different combinations than those recited in the Examples. Accordingly, the present invention should only be limited by the true scope of the appended claims.

Wherefore I claim:

1. A system for decomposing and removing a cured surface coating of paint or varnish from a surface, said system including a stripper composition for decomposing said coating and cover means adapted to cover said stripper composition and said surface coating and further adapted to lift a portion of the decomposed surface coating from said surface when said cover means are removed from said surface, wherein said stripper composition includes methylene chloride in an amount between about 15% and about 85% by weight based on the weight of the total stripper composition and kaolin in an amount between about 15% and about 85% by weight of the total stripper compsition.

2. The system of claim 1 wherein said composition includes methylene chloride in an amount between about 50% and about 60% by weight of the total composition and kaolin in an amount between about 30% and about 40% by weight based on the weight of the total stripper composition.

3. The system of claim 1 wherein said composition includes wood fibers in an amount up to about 30% by weight based on the weight of the total stripper composition.

4. The system of claim 1 wherein said cover means are polypropylene.

5. The system of claim 4 wherein said polypropylene cover means include pile means to which said decomposed surface coating may be attached.

6. A system for decomposing and removing a cured surface coating of paint or varnish from a surface, said system including a stripper composition for decomposing said coating and cover means adapted to cover said stripper composition and said surface coating and further adapted to lift a portion of the decomposed surface coating from said surface when said cover means is removed from said surface, wherein said stripper composition includes as an active component methylene chloride in an amount between about 50% and about 60% by weight of the total composition and kaolin as a carrier in an amount between about 30% and about 40% by weight of the total composition and wherein said cover means include pile elements to which said decomposed surface coating may become attached.

7. The system of claim 6 wherein said stripper composition is a paste.

8. The system of claim 6 wherein said stripper composition further includes wood fiber in an amount up to about 30% by weight based on the weight of the total stripper composition.

9. A system for decomposing and removing a cured surface coating of paint or varnish from a surface, said system including a stripper composition for decomposing said coating and cover means adapted to cover said stripper composition and said surface coating and further adapted to lift a portion of the decomposed surface coating from the surface when said cover means are removed, wherein said stripper composition includes sodium hydroxide and calcium hydroxide as active components.

10. The system of claim 9 wherein said stripper composition further includes wood fiber in an amount up to about 30% by weight based on the weight of the total stripper composition.

11. A system for decomposing and removing a cured surface coating of paint or varnish from a surface, said system including a stripper composition for decomposing said coating and removing said decomposed coating from said surface, said stripper composition including an active component selected from the group consisting of alkali earth metals, alkali metals and organic solvents, a carrier and a thermoplastic fiber, said thermoplastic fiber adapted to form a skin over said composition and facilitate removal of said composition and said decomposed surface coating upon removal of said skin.

12. The system of claim 11 wherein said organic solvent is methylene chloride, said carrier is kaolin and said thermoplastic fiber is polypropylene.

13. The system of claim 12 wherein said stripper composition includes methylene chloride in an amount between about 50% and about 60% by weight, kaolin in an amount between about 30% and about 40% by weight and polypropylene fiber in an amount between 10% and about 30% by weight, all based on weight of the total stripper composition.

14. The system of claim 13 wherein the length of said polypropylene fibers is between about ¼" and about 3".

15. A method for removing a cured surface coating of paint or varnish from a surface, said method comprising the steps of:

providing a system for decomposing and removing said surface coating, said system including a stripper composition for decomposing said coating and cover means adapted to cover said composition and said surface coating and further adapted to lift a portion of the decomposed surface coating from said surface, said stripper composition including as an active component methylene chloride and said cover means being formed from polypropylene fibers;

applying said stripper composition and said cover means to said surface coating;

permitting said stripper composition to react with and decompose said surface coating; and removing said surface coating by lifting off said cover means to which said surface coating is substantially attached.

* * * * *